(12) United States Patent
Taniguchi et al.

(10) Patent No.: US 7,690,044 B2
(45) Date of Patent: Mar. 30, 2010

(54) MEDIUM STORING PROGRAM SELECTING ELECTRONIC TICKET, ELECTRONIC TICKET PROCESSING APPARATUS AND ELECTRONIC TICKET SELECTION METHOD

(75) Inventors: Shinichiro Taniguchi, Tokyo (JP); Takanori Nakanowatari, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1102 days.

(21) Appl. No.: 11/179,891

(22) Filed: Jul. 12, 2005

(65) Prior Publication Data
US 2006/0188097 A1 Aug. 24, 2006

(30) Foreign Application Priority Data
Feb. 18, 2005 (JP) ............................. 2005-041652
Feb. 25, 2005 (JP) ............................. 2005-050502

(51) Int. Cl.
*H04N 7/16* (2006.01)
*G06F 17/30* (2006.01)
(52) U.S. Cl. ...................................... 726/27; 380/201
(58) Field of Classification Search ................ 726/27; 380/201; 705/59, 76
See application file for complete search history.

(56) References Cited

U.S. PATENT DOCUMENTS

| | | | | |
|---|---|---|---|---|
| 5,915,085 A * | 6/1999 | Koved ............................. | 726/1 |
| 6,138,156 A * | 10/2000 | Fletcher et al. ............. | 709/224 |
| 6,487,659 B1 * | 11/2002 | Kigo et al. .................. | 713/168 |
| 6,690,794 B1 * | 2/2004 | Terao et al. .................... | 380/22 |
| 6,802,003 B1 * | 10/2004 | Gross et al. .................. | 713/175 |
| 6,857,071 B1 * | 2/2005 | Nakae .......................... | 713/156 |
| 6,889,210 B1 * | 5/2005 | Vainstein ...................... | 705/57 |
| 7,104,445 B2 * | 9/2006 | Little et al. .................. | 235/382 |
| 7,206,765 B2 * | 4/2007 | Gilliam et al. ................ | 705/51 |
| 7,314,169 B1 * | 1/2008 | Jasper et al. ................. | 235/382 |
| 2004/0034582 A1 * | 2/2004 | Gilliam et al. ................ | 705/31 |
| 2004/0039704 A1 * | 2/2004 | Gilliam et al. ................ | 705/50 |
| 2004/0240846 A1 * | 12/2004 | Cookson et al. ............... | 386/94 |
| 2005/0039003 A1 * | 2/2005 | Wray ......................... | 713/166 |
| 2005/0238325 A1 * | 10/2005 | Tanabe et al. ................. | 386/95 |
| 2006/0112015 A1 * | 5/2006 | Chancellor et al. ............ | 705/51 |
| 2006/0239501 A1 * | 10/2006 | Petrovic et al. ............. | 382/100 |
| 2006/0239502 A1 * | 10/2006 | Petrovic et al. ............. | 382/100 |
| 2007/0016532 A1 * | 1/2007 | Zhang et al. .................. | 705/59 |
| 2007/0174064 A1 * | 7/2007 | Selgert .......................... | 705/1 |

FOREIGN PATENT DOCUMENTS

| | | |
|---|---|---|
| JP | 10093550 | 4/1998 |
| JP | 11213104 | 8/1999 |
| JP | 2000048076 | 2/2000 |

* cited by examiner

*Primary Examiner*—David García Cervetti
(74) *Attorney, Agent, or Firm*—Gauthier & Connors LLP

(57) ABSTRACT

One or more computer-readable media on which is stored a program for selecting an optimum electronic ticket among a plurality of electronic tickets for imparting rights of use of content, the stored program causing a computer to execute functions comprising: extracting a plurality of electronic tickets corresponding to a content; and selecting the optimum electronic ticket among the extracted electronic tickets by comparing conditions of use of content included in the respective extracted electronic tickets.

23 Claims, 5 Drawing Sheets

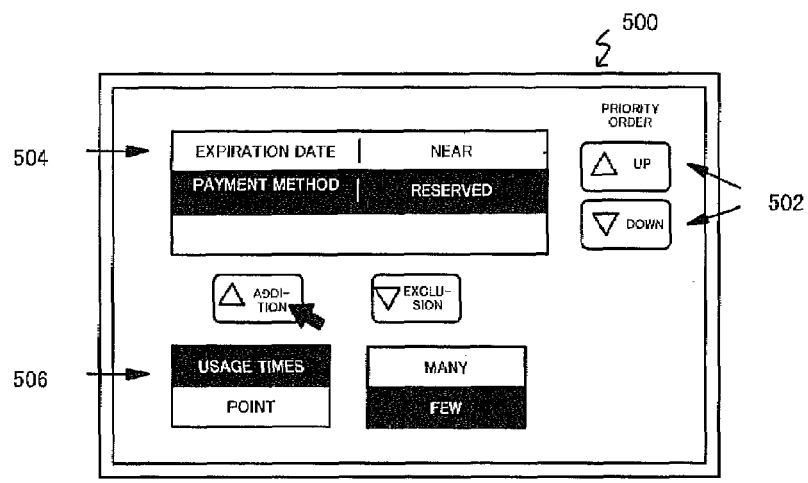
Fig. 5
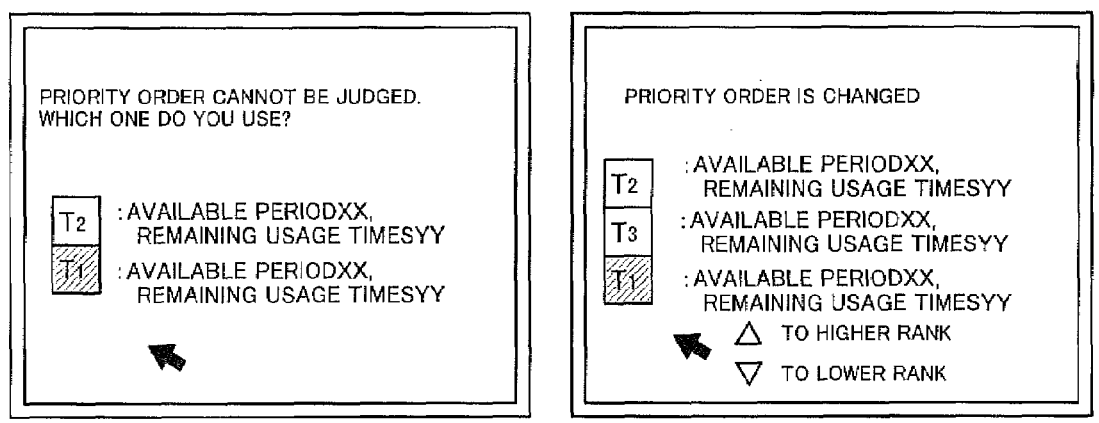
Fig. 6A                     Fig. 6B

MEDIUM STORING PROGRAM SELECTING ELECTRONIC TICKET, ELECTRONIC TICKET PROCESSING APPARATUS AND ELECTRONIC TICKET SELECTION METHOD

PRIORITY INFORMATION

This application claims priority to Japanese Patent Applications Nos. 2005-041652, filed Feb. 18, 2005 and 2005-050502, filed Feb. 25, 2005, which is incorporated herein by reference in its entirety.

BACKGROUND OF THE INVENTION

1. Field of the Invention

The present invention relates to a technique for selecting an optimum electronic ticket from among a plurality of electronic tickets.

2. Description of the Related Art

A technique involving the use of electronic tickets is known as a technique for preventing abuses and illegal dispositions of digital content such as image and text data.

In an example system using electronic tickets, a digital content provider delivers digital content to a user after encrypting (encapsulating) the digital content. An electronic ticket is required to decrypt the encrypted content. The electronic ticket is issued in accordance with the characteristics of the hardware such as a computer employed by the user, and is provided to the user. Consequently, use of the digital content is permitted only to a legitimate user using the computer corresponding to an electronic ticket.

Varied states of operational authority can also be given to the electronic ticket. For example, it is possible to set whether or not the authority of a printing operation or an editing operation of a digital content is given to a user. Thereby, it becomes possible to permit, for example, only the browsing of the digital content by a user and to restrict other operations.

As described above, the use electronic tickets can prevent abuse of digital content while realizing various forms of providing the content. For example, a plurality of electronic tickets may be provided with respect to one item of digital content.

When a plurality of electronic tickets effective to a certain digital content exist, conventionally a user compares the contents of the electronic tickets, and selects a desired electronic ticket. That the option of an electronic ticket is granted to a user also has an aspect of raising the degree of freedom of use of the electronic ticket. However, for example, when the aspects of operational authority vary among a plurality of electronic tickets, a user is forced to spend time and effort to select an electronic ticket while comparing the various levels or aspects of operational authority. In particular, when using a plurality of aspects of operational authority provided separately by a plurality of electronic tickets, selecting a suitable electronic ticket is complicated and, at times, difficult.

When using a plurality of aspects of operational authority provided by a plurality of electronic tickets in combination, there is a point which should be taken into consideration also from the side of the processing of the computer in which the electronic tickets are used. In the case where a digital content is used with an electronic ticket, the computer using the electronic ticket confirms whether or not the electronic ticket is effective one to the digital content, and performs the processing releasing the encapsulation of the ticket is effective. A series of such authentication processings may undesirabley create an enormous data processing burden on the computer.

Consequently, when a plurality of electronic tickets is used, it is desirable to select an electronic ticket efficient for authentication processing in a computer in addition to realizing the combination of an operation authority advantageous for a user.

Moreover, for example, when mutually different using conditions are imparted to a plurality of electronic tickets, the user is forced to select usage condition while comparing the using conditions. In particular, it is not always easy for the user to select an advantageous ticket.

For example, if a user has electronic tickets 1 and 2, the electronic ticket 1 permitting the use of two sets of content A and B without no limitations, and the electronic ticket 2 permitting the use of content sets B and C only a specified number of times, then, in the case where the user uses the electronic ticket 2 for using the content B, the value of the electronic ticket 2 decreases, and consequently the usable number of times the content C can be accessed decreases. This cannot be said to be an advantageous ticket selection for the user.

SUMMARY OF THE INVENTION

In consideration of the above, the present invention provides a technique for selecting the optimum electronic ticket among a plurality of electronic tickets is provided.

One or more computer-readable media on which is stored a program for selecting an optimum electronic ticket among a plurality of electronic tickets for imparting rights of use of content, the stored program causing a computer to execute functions comprising: extracting a plurality of electronic tickets corresponding to a content; and selecting the optimum electronic ticket among the extracted electronic tickets by comparing conditions of use of content included in the respective extracted electronic tickets.

BRIEF DESCRIPTION OF THE DRAWINGS

Embodiments of the present invention will be described in detail based on the following figures, wherein:

FIG. 5 is a view for illustrating an image for setting a criterion; and

FIGS. 6A and 6B are views for illustrating images with which an electronic ticket is selected.

DETAILED DESCRIPTION OF THE PREFERRED EMBODIMENTS

Hereinafter, Embodiments of the present invention are described in connection with the attached drawings.

Figure 1:
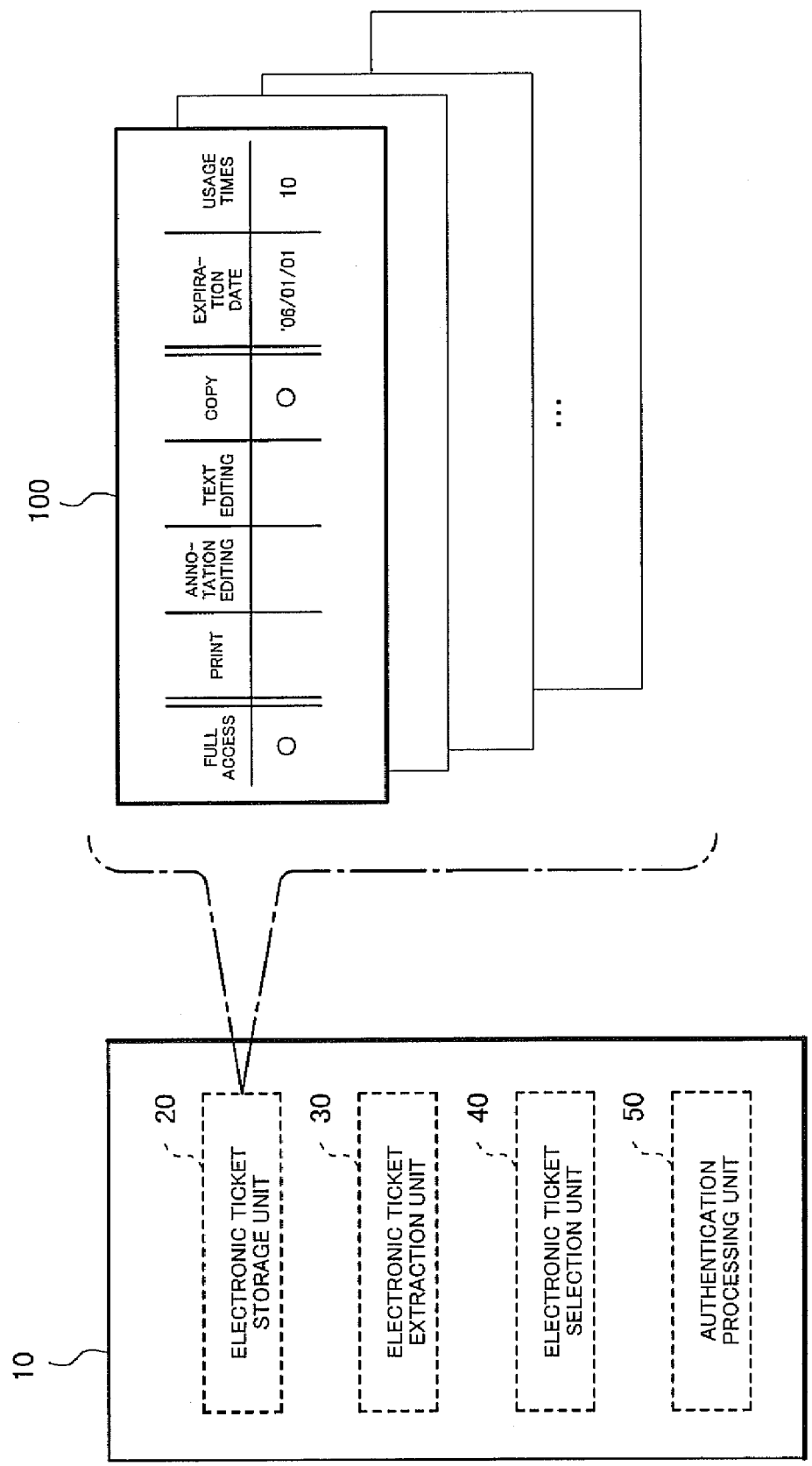
FIG. 1 is a functional configuration diagram of the inside of a computer operating in accordance with the programs stored by a medium according to an Embodiment 1 of the present invention.

FIG. 1 is a view for illustrating an Embodiment 1 of the present invention. FIG. 1 shows the functional configuration in the inside of a computer which operates in accordance with the programs stored in the medium according to the present invention. The programs stored in the medium according to the present invention cause a computer 10 to function as an electronic ticket processing apparatus handling a plurality of electronic tickets 100.

The computer 10 is provided with hardware components such as a CPU, a memory, and a hard disk drive, which are not shown. When a program stored in a medium according to the present invention is read by the computer 10, the program and the hardware cooperate to realize each function of an electronic ticket storage unit 20, an electronic ticket extraction unit 30, an electronic ticket selection unit 40, and an authentication processing unit 50 shown in FIG. 1. For example, the functions of the electronic ticket extraction unit 30, the electronic ticket selection unit 40 and the authentication processing unit 50 are mainly realized by the CPU and the memory. Moreover, for example, a storage area in the inside of the hard disk is used as the electronic ticket storage unit 20.

The medium in which the programs are stored, may be a storage medium such as an optical disk, a magnetic disk, or a flash memory. The programs may be directly provided to the computer 10 from the storage medium, or the programs may be provide to the computer 10 through a network.

The functions in the inside of the computer 10 shown in FIG. 1 may be realized by one program, or may be realized by a plurality of programs. For example, the functions of the electronic ticket storage unit 20 and the authentication processing unit 50 may be realized by the authentication processing program, and the functions of the electronic ticket extraction unit 30 and the electronic ticket selection unit 40 may be realized by a ticket selection program provided as a tool for supporting the authentication processing program.

The computer 10 is a terminal device of a user using digital content such as image and text data. The digital content is provided from, for example, a content delivery server on a content providing side, or the like. In order to prevent abuses and illegal dispositions, the digital content is provided in a state in which encapsulation processing is performed. In order to decrypt the encapsulation, an electronic ticket 100 is needed.

The electronic ticket 100 is issued in accordance with the inherent information of the hardware such as the computer 10 employed by the user (in order to be able to be used only by the hardware), and the electronic ticket 100 is provided to the user from a ticket issue server or the like. Of course, an electronic ticket may be generated by the content delivery server on the contents providing side to be provided to the user. Content provision using the electronic ticket 100 makes it possible to permit the use of digital content only when a legitimate user uses the computer 10 corresponding to the electronic ticket 100. Naturally, an electronic ticket 100 which can be used by a plurality of terminal devices used by a legitimate user uses may also be generated.

The operational authority (access rights) of a user is also given to the electronic ticket 100 as the conditions of use of the content. For example, the electronic ticket 100 can indicate whether or not the user is granted the authority of a printing operation, an editing operation, or the like of a digital content. By setting the operation authority appropriately, it becomes possible to permit only the browsing of a digital content to a user and to restrict the other operations, for example.

The effective electronic ticket 100 may not be restricted to be one ticket (or data equivalent) for each digital content, but a plurality of electronic tickets 100 may be effective to one digital content. A plurality of electronic tickets 100 corresponding to certain digital content is stored in the electronic ticket storage unit 20. Furthermore, electronic tickets 100 corresponding to other digital content may also be stored.

A grant state of operational authority to a user by the electronic ticket 100 is schematically shown in FIG. 1. To the electronic ticket 100 of the present embodiment 1, setting of each of full access, print, annotation editing, text editing, copy, expiration date, and usage times is possible as the operation authority of the user. Naturally, the authorities which can be set in the electronic ticket 100 are not limited to those shown in FIG. 1. In FIG. 1, a circle in the lower column of an operation item indicates that the operation is permitted. That is, in the example of FIG. 1, full access and copying (duplication) are permitted, while the other operations are not permitted.

When the full access is permitted, a user having the electronic ticket 100 can change the attribute of the encapsulated digital content, and can use the digital content in full access mode. In the full access mode, for example, it becomes possible to store an original digital content, the encapsulation of which has been released in the hard disk in the own computer 10 to handle the stored original digital content freely. However, even when the full access is permitted, it is also possible to handle a digital content by the operation permitted by general operation authority such as the print, the annotation editing, the text editing, and copying without using the full access mode.

When printing is permitted, by releasing the encapsulation of the encapsulated digital content, a user having the electronic ticket 100 is enabled to print the content, in addition to browsing the content. Moreover, when annotation editing is permitted, by releasing the encapsulation of the encapsulated digital content, a user having the electronic ticket 100 is enabled to perform annotation editing, which inserts an annotation or the like into the content, in addition to browsing the content.

When text editing is permitted, by releasing the encapsulation of the encapsulated digital content, a user having the electronic ticket 100 is able to edit the content (text), in addition to browsing the content. When the contents are not the text data, but, for example, image data or sound data, the editing of the images or sounds may also be permitted.

When copying is permitted, by releasing the encapsulation of the encapsulated digital content, a user having the electronic ticket 100 is able to copy the content to another application on the memory in addition to browsing the content. For example, it is possible to insert the content into other text data or the like, but copying the content to an external hard drive or the like remains prohibited.

In addition to each operational authority mentioned above, it is possible to set the expiration date and the usage times of the ticket to an electronic ticket 100. In the example shown in FIG. 1, the expiration date "Jan. 1, 2006" is set to the electronic ticket 100. When the expiration date is set, the electronic ticket 100 can be used up to the expiration date, and the ticket becomes invalid after the expiration date.

Moreover, in the example shown in FIG. 1, ten uses are set to the electronic ticket 100. When the number of uses is so set, the electronic ticket 100 can be used only that many times. For example, if a ticket is used five times in full access mode and is used for copying five times, the ticket becomes invalid as it has been used 10 times.

A plurality of electronic tickets 100 may be stored in the electronic ticket storage unit 20, and a plurality of electronic tickets 100 effective to a certain digital content exist in the electronic tickets 100 in the electronic ticket storage unit 20. Furthermore, settings of aspects of the operational authority performed to each of the electronic tickets 100 may differ in regards to a certain digital content. Consequently, it is possible to use a plurality of aspects of operational authority provided by combination of a plurality of electronic tickets 100. In such a case, in the present Embodiment 1, the selection of the electronic tickets 100 optimum for effective authentication processing is performed automatically.

Hereinafter, the selection processing of the electronic tickets 100 in the present embodiment 1 will be described.

When provided digital content is used by the computer 10, the electronic ticket extraction unit 30 extracts a plurality of electronic tickets 100 corresponding to the provided digital content out of a plurality of electronic tickets 100 stored in the electronic ticket storage unit 20. Next, the electronic ticket selection unit 40 compares the using conditions of the content included in each of the plurality of extracted electronic tickets 100, and provides the electronic tickets 100 to the authentication processing unit 50 in the order of the "strength" of the using conditions (conditions of use of content), with those tickets authorizing wider access being considered "stronger" than those offering relatively narrower or more restricted access.

The authentication processing unit 50 executes authentication processing using the provided electronic tickets 100. That is, the authentication processing unit 50 performs verification processing to determine whether or not the encapsulated digital content can be used using the provided electronic tickets 100. When an authentication result is positive, the user is allowed use the digital content by the operation permitted by the electronic ticket 100. On the other hand, when the authentication result is negative, the next electronic ticket 100 is provided from the electronic ticket selection unit 40 to the authentication processing unit 50, and the authentication processing is performed on that provided electronic ticket 100. In such a way, the search of the electronic tickets 100 is performed until the authentication processing returns a positive result or all tickets are exhausted.

As one characteristic process of the present Embodiment 1, selection processing of the electronic tickets 100 by the electronic ticket selection unit 40 can be cited.

Figure 2:
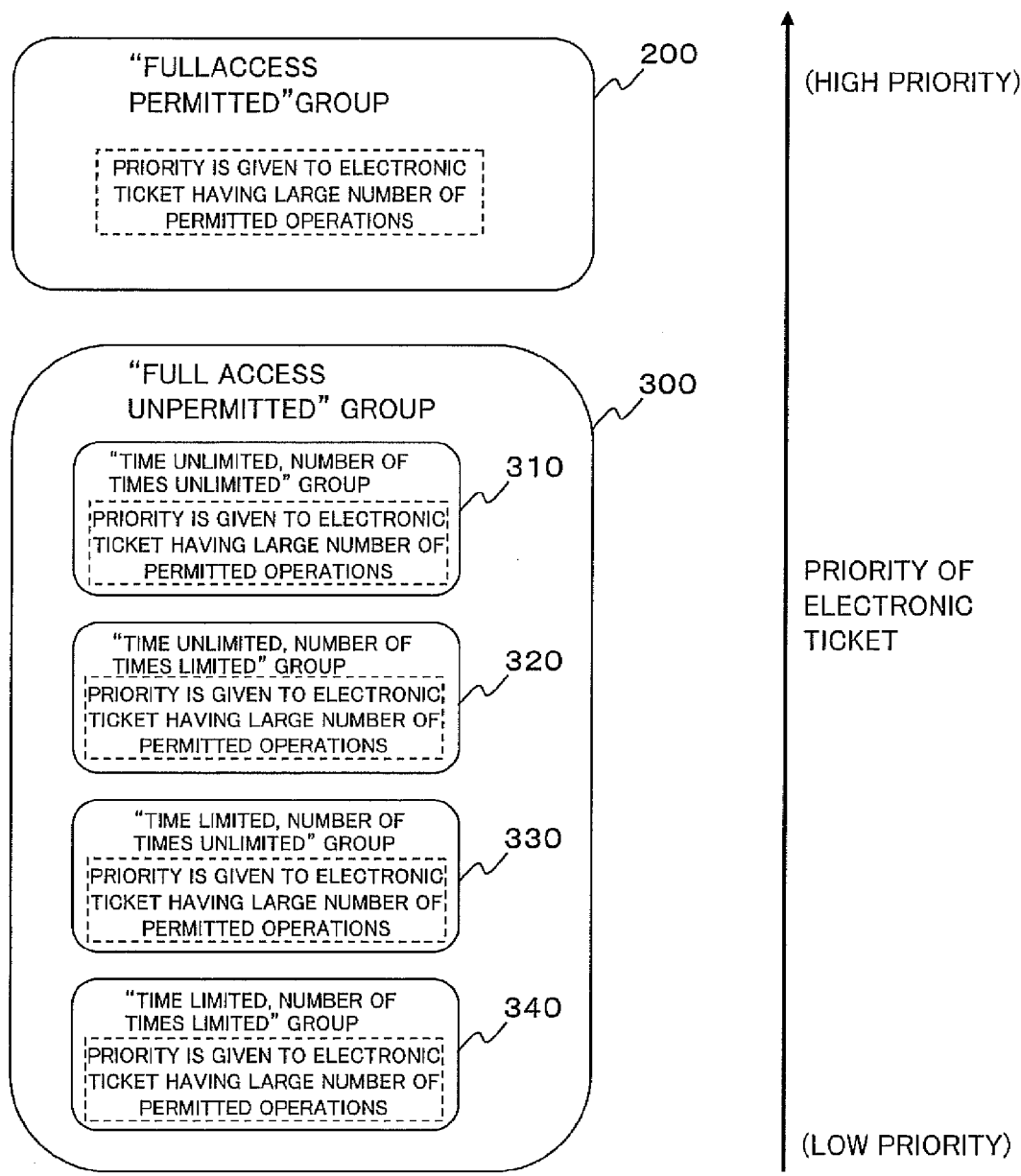
FIG. 2 is a view for illustrating selection processing of an electronic ticket.

FIG. 2 is a view for illustrating the selection processing of the electronic tickets 100 by the electronic ticket selection unit 40. The electronic ticket selection unit 40 first performs grouping of a plurality of electronic tickets 100 corresponding to a certain digital content into two ticket groups according to whether or not full access is permitted. That is, the grouping is performed into two groups of a "full access permitted" group 200, in which the full access is permitted, and a "full access prohibited" group 300, for which full access is not permitted. Then, the electronic ticket selection unit 40 judges that the "full access permitted" group 200 is a group having high priority. That is, because the original digital content the encapsulation of which has been released can be used when the full access is permitted, all operations can be performed. Accordingly, the electronic ticket selection unit 40 judges the "full access permitted" group 200 to be a "strong" electronic ticket (group).

When a plurality of electronic tickets is included in the "full access permitted" group 200, the permission state pertaining to the general operation authority of printing, annotation editing, text editing, and copying is verified, and an electronic ticket permitting a large number of operations is judged to be a ticket having high priority. In such a way, the electronic tickets are arranged in the "full access permitted" group 200 in the order of priority. When there are the tickets having the same number of the permitted operations, the priority order may be determined according to the permitted operations in such a way of imparting priority to the ticket by which the operation of the text editing is further permitted.

On the other hand, when a plurality of electronic tickets is included in the "full access prohibited" group 300, further grouping is performed according to expiration date and the number of allowed uses. That is, the grouping is performed in accordance with the priority order of a "time unlimited, number of uses unlimited" group 310, in which both of the expiration date and the usage times are not set, a "time unlimited, number of uses limited" group 320, in which only the usage times are set, a "time limited, number of uses unlimited" group 330, in which only the expiration date is set, and a "time limited, number of uses limited" group 340, in which both of the expiration date and the usage times are set.

Moreover, when a plurality of electronic tickets is included in each of the groups from the "time unlimited, number of uses unlimited" group 310 to the "time limited, number of uses limited" group 340, the permission state pertaining to the general operation authority of printing, annotation editing, text editing, and copying is verified in each group, and an electronic ticket having a large number of the permitted operations is judged to be a ticket having high priority.

In such a manner, the priority order of all of the plurality of electronic tickets 100 corresponding to a certain digital content can be determined. Then, the electronic tickets are provided to the authentication processing unit 50 sequentially in the order of priority, and the authentication processing is performed. Consequently, it becomes possible to select the optimum electronic ticket for the efficient authentication processing at the time of using certain digital content.

For example, if authentication processing is first performed using an electronic ticket which does not authorize full access, it is necessary to further perform authentication processing using an electronic ticket which permits full access in order to subsequently use the content in the full access mode. That is, authentication processing is performed twice in such a case. On the contrary, in the present Embodiment 1, because an electronic ticket in permitting full access is used preferentially, it becomes possible to grant wide operation authority to a user after only one authentication processing.

Here, it should be noted that, although the "time unlimited, number of uses limited" group 320 is judged to be a group having higher priority than the "time limited, number of uses unlimited" group 330 in the example shown in FIG. 2, the "time limited, number of uses unlimited" group 330 may be judged to be a group having higher priority than the "time unlimited, number of uses limited" group 320. Moreover, further grouping may be performed also in the "full access permitted" group 200 according to the existence of the restriction of the expiration date and the usage times, and similarly in the "full access prohibited" group 300. Moreover, a user may specify an operation (printing, annotation editing, text editing, or copying) for which permission is desired, and the priority of an electronic ticket which permits the specified operation may be elevated.

Figure 3:
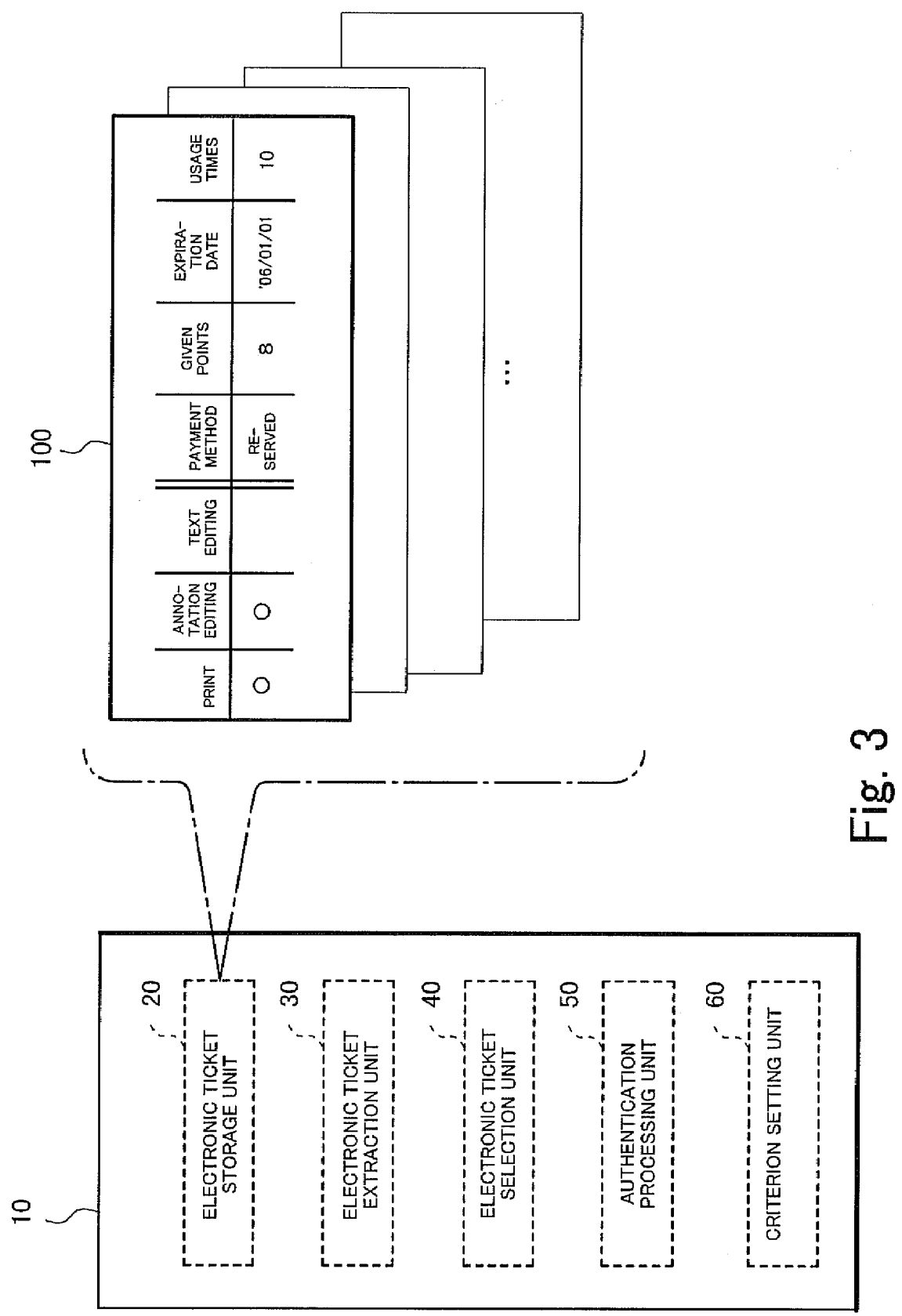
FIG. 3 is a functional configuration diagram in the inside of a computer operating in accordance with the programs stored in a medium according to an Embodiment 2 of the present invention.

FIG. 3 is a view illustrating an Embodiment 2 of the present invention, and FIG. 3 shows the functional configuration in the inside of a computer which operates in accordance with the programs stored in a medium according to the present invention. The programs stored in the medium according to the present invention enable a computer 10 to function as an electronic ticket processing apparatus for handling a plurality of electronic tickets 100.

The computer 10 is provided with hardware components such as a CPU, a memory, and a hard disk drive, which are not shown. Then, by the cooperation of a program and a hardware configuration according to the present invention, each function of an electronic ticket storage unit 20, an electronic ticket extraction unit 30, an electronic ticket selection unit 40, an authentication processing unit 50 and a criterion setting unit 60 shown in FIG. 3 is realized. For example, the functions of the electronic ticket extraction unit 30, the electronic ticket selection unit 40, the authentication processing unit 50, and the criterion setting unit 60 are mainly realized by the CPU and the memory. Moreover, for example, a storage area in the hard drive is used as the electronic ticket storage unit 20.

The medium, in which the programs are stored, may be a storage medium such as an optical disk, a magnetic disk, or a flash memory. The programs may be directly provided to the computer 10 from the storage medium, or the programs may be provide to the computer 10 through a network.

The functions of the computer 10 shown in FIG. 3 may be realized by one program, or may be realized by a plurality of programs. For example, the functions of the electronic ticket storage unit 20 and the authentication processing unit 50 may be realized by the authentication processing program, and the functions of the electronic ticket extraction unit 30, the electronic ticket selection unit 40, and the criterion setting unit 60 may be realized by a ticket selection program provided as a tool for supporting the authentication processing program (or an application program including the authentication processing program).

The computer 10 is a terminal device of a user of digital content such as image data and text data. The digital content is provided from, for example, a content delivery server on a content providing side, or the like. In order to prevent abuse and illegal dispositions, the digital content is provided in an encapsulated state. In order to decrypt the encapsulation, the electronic ticket 100 is needed.

The electronic ticket 100 is issued in accordance with the inherent information of the hardware such as the computer 10, used by the user, and the electronic ticket 100 is provided to the user from a ticket issue server or the like. Naturally, an electronic ticket may also be generated by the content delivery server on the contents providing side to be provided to the user. By requiring the electronic ticket 100 when providing content, it becomes possible to permit the use of digital content only when a legitimate user uses the computer 10 corresponding to the electronic ticket 100, for example. An electronic ticket 100 which can be used at any of a plurality of terminal devices used by a legitimate user may also be generated.

The conditions of use of the content are also indicated by the electronic ticket 100. For example, the ticket can indicate whether or not the authority to request a printing operation, an editing operation, or the like is granted to a user in association with particular digital content. By setting the using conditions appropriately, it becomes possible to permit, for example, only the browsing of a digital content, while restricting other operations.

The effective electronic ticket 100 may not be restricted to be one ticket (or data equivalent) for each digital content, but a plurality of electronic tickets 100 may be effective to one digital content. A plurality of electronic tickets 100 corresponding to certain digital content is stored in the electronic ticket storage unit 20. Furthermore, electronic tickets 100 corresponding to other digital content may also be stored.

A grant state of the conditions of use of content by the electronic ticket 100 is schematically shown in FIG. 3. To the electronic ticket 100 of the present embodiment 2, there are shown the using conditions (conditions of use of content) such as a payment method, given points, an expiration date, and allowed number of uses, in addition to the setting of the operational authority of a user such as printing, annotation editing, and text editing. Naturally, the conditions capable of being imparted to the electronic ticket 100 are not limited to the conditions shown in FIG. 3. In FIG. 3, round marks in the lower column indicate which operations are permitted among printing, annotation editing, and text editing. That is, in the example of FIG. 3, a state in which printing and annotation editing are permitted, and the other operations are not permitted, is shown.

When printing is permitted, by releasing the encapsulation of the encapsulated digital content, it becomes possible for the user of the electronic ticket 100 to print the content, in addition to browsing the content. Moreover, when annotation editing is permitted, by releasing the encapsulation of the encapsulated digital content, it becomes possible for the user of the electronic ticket 100 to perform annotation editing, inserting annotation or the like into the content, in addition to browsing the content.

When text editing is permitted, by releasing the encapsulation of the encapsulated digital content, it becomes possible for the user of the electronic ticket 100 to edit the content (text), in addition to browsing the content. When the content is not text data, but, for example, image or sound data, the edition of images or sounds may be permitted.

Authorizations for the likes of full access and copying may be set as the operational authority. When full access is permitted, the user of the electronic ticket 100 can change the attributes of the encapsulated digital content, and can use the digital content in a full access mode. In the full access mode, it becomes possible, for example, to store the original digital content, the encapsulation of which has been released, in the hard drive of the user's own computer 10 where the user can freely use the stored original digital content.

Moreover, when copying is permitted, by releasing the encapsulation of the encapsulated digital content, it becomes possible for the user of the electronic ticket 100 to copy the content to another application in that memory, in addition to browsing the content. For example, it is possible for the user to insert the content into other text data or the like. However, copying of the content to a hard drive or the like remains prohibited.

In addition to each operation authority noted above, information of the payment method and usage points is shown in the electronic ticket 100. The payment method refers to the method of charging the user for use of the content by means of the electronic ticket 100. Two such methods include a reserved method and a pay-as-you-go method. The reserved method is a payment method enabling unconfined use of a ticket (content) by paying a fixed charge for use of the ticket. On the other hand, the pay-as-you-go method is a payment method of paying a charge for each use of the ticket (each content accessed). In the example shown in FIG. 3, the payment method of the electronic ticket 100 is set as the reserved payment.

Usage points refers to a service point given to a user according to the use of the electronic ticket 100. For example, a predetermined number of points may be added each time the user uses the ticket (content), and service is provided to the user according to added points from the content provider or the like.

Moreover, it is possible to set the expiration date and the usage times of the ticket to the electronic ticket 100.

In the example shown in FIG. 3, the expiration date of Jan. 1, 2006 is set to the electronic ticket 100. When the expiration date is set, the electronic ticket 100 can be used until the expiration date, and the ticket becomes invalid after the expiration date.

Moreover, in the example shown in FIG. 3, ten uses are set in the electronic ticket 100. When the number of uses are set, the electronic ticket 100 can be used only that number of times. For example, if the user performs printing five times and copying five times, they will have used the ticket 10 times, and, if it is a 10 use ticket, the ticket will no longer be valid after the 10th use.

A plurality of electronic tickets 100 may be stored in the electronic ticket storage unit 20, and a plurality of electronic tickets 100 effective for certain digital content may be present among the electronic tickets 100 stored in the electronic ticket storage unit 20. Furthermore, setting of different usage conditions is performed to each of the electronic tickets 100 effective for certain digital content. In the present embodiment 2, selection of electronic tickets 100 optimum for the authentication processing and advantageous for a user is performed.

Hereinafter, the selection processing of the electronic tickets 100 in the present embodiment 2 will be described.

When provided digital content is used by the computer 10, the electronic ticket extraction unit 30 extracts a plurality of electronic tickets 100 corresponding to the provided digital content from among the plurality of electronic tickets 100 stored in the electronic ticket storage unit 20. Next, the electronic ticket selection unit 40 compares the using conditions of the content included in each of the plurality of extracted electronic tickets 100, and provides the electronic tickets 100 to the authentication processing unit 50 in the order of their priority.

The authentication processing unit 50 executes authentication processing using the provided electronic tickets 100. That is, the authentication processing unit 50 performs verification processing to verify whether or not the provided electronic tickets 100 authorize use of the encapsulated digital content. When an authentication result is positive, the user can use the digital content by the operation permitted by the electronic ticket 100. On the other hand, when the authentication result is negative, the next electronic ticket 100 is provided from the electronic ticket selection unit 40 to the authentication processing unit 50, and the authentication processing is performed using the provided electronic ticket 100. In such a way, all electronic tickets 100 are searched until the authentication processing can be performed successfully.

As one of the characteristics of the present Embodiment 2, selection processing of the electronic tickets 100 by the electronic ticket selection unit 40 can be cited.

Figure 4:
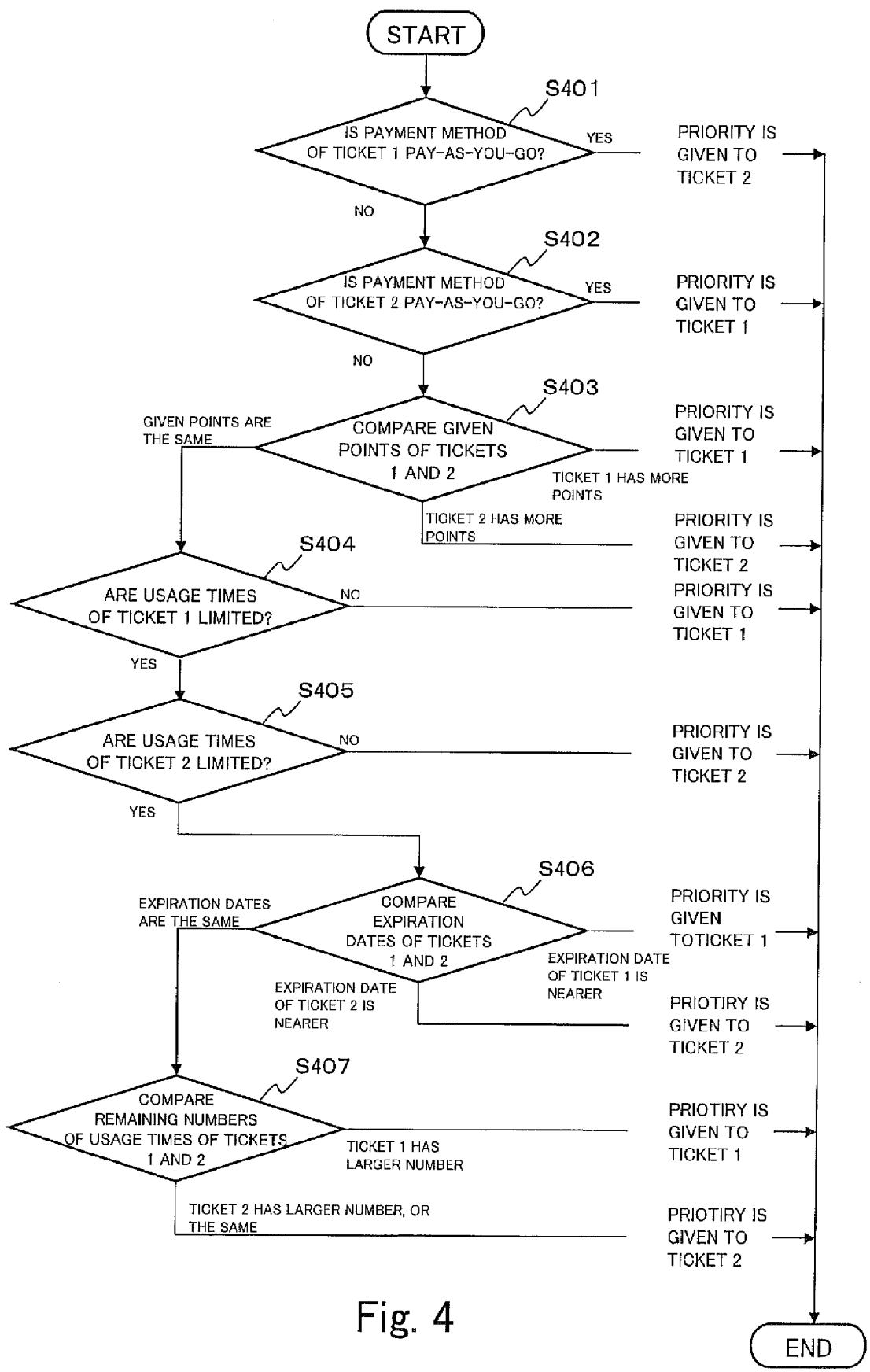
FIG. 4 is a view for illustrating selection processing of an electronic ticket.

FIG. 4 is a flowchart illustrating the selection processing of the electronic tickets 100 by the electronic ticket selection unit 40. In the flowchart of FIG. 4, the comparison of priority of two electronic tickets (ticket 1 and ticket 2) is shown. When three or more electronic tickets are compared, the comparison of the priority of all of the three or more electronic tickets can be performed by performing the comparison of the priority of all of the combinations of the two electronic tickets realized by the three or more electronic tickets in accordance with the flowchart of FIG. 4. In the following, the processing at each step shown in the flowchart of FIG. 4 is described.

(Step S401) The electronic ticket selection unit 40 verifies whether or not the payment method of the ticket 1 among the tickets 1 and 2 included in a plurality of the electronic tickets corresponding to a certain digital content extracted by the electronic ticket extraction unit 30 is the pay-as-you-go method. Then, when it is determined that the payment method of the ticket 1 is the pay-as-you-go method, the electronic ticket selection unit 40 judges that the priority should be given to the ticket 2, and ends processing. On the other hand, when the payment method of the ticket 1 is not the pay-as-you-go method, the processing proceeds to the next step.

(Step S402) When the payment method of the ticket 1 is not the pay-as-you-go method, the electronic ticket selection unit 40 verifies whether or not the payment method of the ticket 2 is the pay-as-you-go method. Then, when it is determined that the payment method of the ticket 2 is the pay-as-you-go method, the electronic ticket selection unit 40 judges that the priority should be given to the ticket 1, and ends processing. On the other hand, when the payment method of the ticket 2 is not the pay-as-you-go method, the processing proceeds to the next step.

(Step S403) Next, the electronic ticket selection unit 40 compares the number of points imparted to each of the tickets 1 and 2. Then, when the ticket 1 has more points, the electronic ticket selection unit 40 judges that the priority is given to the ticket 1 and, when the ticket 2 has more points, the electronic ticket selection unit 40 judges that the priority should be given to the ticket 2, and ends processing. When the numbers of the given points are the same, including when both of the tickets 1 and 2 have no remaining points, the processing proceeds to the next step.

(Step S404) Next, the electronic ticket selection unit 40 verifies whether not the allowed uses of the ticket 1 is limited or. Then, when it is determined that the number of uses of the ticket 1 is not restricted, the electronic ticket selection unit 40 judges that the priority should be given to the ticket 1, and ends processing. On the other hand, when it is determined that the number of uses of the ticket 1 is restricted, the processing proceeds to the next step.

(Step S405) When the number of times the ticket can be used is restricted, the electronic ticket selection unit 40 verifies whether or not the number of times the ticket 2 is restricted. Then, when the number of uses of the ticket 2 has no restriction, the electronic ticket selection unit 40 judges that the priority should be given to the ticket 2, and the processing is ended. On the other hand, when it is determined that the number of uses of the ticket 2 is restricted, the processing proceeds to the next step.

(Step S406) The electronic ticket selection unit 40 compares the expiration dates of the tickets 1 and 2. Then, when the expiration date of the ticket 1 is earlier, the electronic ticket selection unit 40 judges that the priority should be given to the ticket 1. When the expiration date of the ticket 2 is earlier, the electronic ticket selection unit 40 judges that the priority should be given to the ticket 2, and ends the processing. When the expiration dates are the same, including cases where neither of the tickets 1 and 2 has any expiration date, the processing proceeds to the next step.

(Step S407) Then, the electronic ticket selection unit 40 compares restriction of the uses of the tickets 1 and 2, and gives the priority to the ticket having a larger remaining number of remaining allowed uses. That is, when the remaining number of uses of the ticket 1 is larger, the priority is given to the ticket 1. On the other hand, when the remaining number of uses of the tickets 2 is larger, the priority is given to the ticket 2, and the processing is ended. When the remaining numbers of the usage times of the tickets 1 and 2 are the same, the priority is given to the ticket 2. In such a way, the priority is given to either the ticket 1 or the ticket 2.

It should be note that, although the priority is given to the ticket having an earlier expiration dateat Step S406 in the flowchart of FIG. 4, the priority may be given to the ticket having a later expiration date when so desired. Similarly, although the priority is given to the ticket having a larger remaining number of the uses at Step S407 in the flowchart of FIG. 4, the priority may be given to the ticket having a fewer remaining uses.

Moreover, in the present embodiment, the comparison procedure of the priority shown in the flowchart of FIG. 4 can also be modified. That is, although each condition of use is compared in the flowchart of FIG. 4 in the order of the comparison pertaining to the payment of a charge (Steps S401 and S402), the comparison of the given points (Step S403), the comparison of the existence of available usage times (Steps S404 and S405), the comparison of the expiration date (Step S406), and the comparison of the remaining number of the usage times (Step S407), the order of the comparisons of these using conditions can also be modified. Furthermore, using conditions other than those shown in the flowchart of FIG. 4 may be added to the comparison objects.

Such modification or resetting of the order of comparisons of the using conditions and the setting of the using conditions for comparison are performed in the criterion setting unit 60. That is, the criterion setting unit 60 sets the comparisons by the flowchart shown in FIG. 4 as the preset criteria, for example, and, on the other hand, changes the criteria according to a criterion change operation or the like requested by a user. When the criterion change operation is received from the user, the criterion setting unit 60 generates a graphical user interface (GUI) image(screen) for setting a criterion.

FIG. 5 is a view illustrating a GUI image for setting a criterion. A criterion setting image 500 is a GUI image for setting and changing a criterion at the time of judging the priority of an electronic ticket. The criterion setting image 500 is displayed, for example, on the monitor of a computer.

The criterion setting image 500 is provided with a comparison order display portion 504 displaying each using condition in the order of comparisons, priority order change buttons 502 for changing the comparison orders (priority orders) of the using conditions, a using condition display portion 506 displaying the using conditions to be added or deleted, and the like.

In the comparison order display portion 504, the currently set comparison order is displayed. When the comparison order is changed, a user moves the cursor to a condition the order of which the user wants to change in the comparison order display portion 504. The cursor is set to the "payment method" in FIG. 5. Then, to raise the priority order of the using condition corresponding to the cursor, the user clicks on the "up" button found among the priority order change buttons 502. On the other hand, to lower the priority order, the user clicks on the "down" button. The criterion setting unit 60 changes the priority order according to the operation of the change button 502 by the user, and causes the results to be reflected in the comparison order display portion 504. For example, when an operation of raising the priority order of the "payment method" is performed by the user in the state in which the priority order of the "expiration date" is set to be higher than that of the "payment method" as shown in FIG. 5, the priority order of the "payment method" is changed to be higher than that of the "expiration date".

Moreover, to add an additional usage condition item to the set comparison order, the cursor is set to the usage condition desired to be added among the items of the using conditions displayed on the using condition display portion 506, and then the "addition" button is selected. For example, when the "addition" button is selected in the state in which the cursor is set to the "usage times" as shown in FIG. 5, the "usage times" is added as a criterion, and the added result is displayed in the comparison order display portion 504. On the other hand, to delete an item from the set comparison order, the cursor is set to the usage condition for which deletion is desired among the items of the using conditions displayed in the comparison order display portion 504, and then the "exclusion" button is selected. For example, when the "exclusion" button is slected in the state in which the cursor is set to the "payment method" as shown in FIG. 5, the "payment method" is deleted from the criteria, and as the deletion result the display of the "payment method" also disappears from the comparison order display portion 504.

By using the criterion setting image 500 in such a manner, the user can easily change a criterion. Moreover, as the method of setting the criteria, in addition to the method of setting the criteria through a GUI such as the criterion setting image 500, tools such as a text editor may be used to set the criteria in an initialization file and a registry and may cause the computer read the criteria. For example, in the case where a ticket having an early expiration date is given the priority and also a ticket having a small remaining number of the usage times is given the priority when the expiration dates are the same, the following character string may be inserted into the initialization file using a text editor:

$ValidityDate^A RemainingTimes^A ("ValidityDate" indicates an expiration date, "RemainingTimes" indicates remaining usage times, and "A" indicates an ascending order.)

Moreover, in the Embodiment 2, the electronic ticket to be selected may be selected by a user among the electronic tickets searched by the electronic ticket selection unit 40.

FIGS. 6A and 6B are views for illustrating GUI images by which a user may select an electronic ticket. FIG. 6A is a selection image displayed when two or more electronic tickets have the same priority. The flowchart of FIG. 4 described earlier describes the criterion by which either the ticket 1 or the ticket 2 is selected. However, when the criterion is changed by the criterion setting unit 60, there is the possibility that a plurality of tickets having the same priority order may be searched. Accordingly, when the electronic tickets having the same priority order exist, a selection image of an electronic ticket is displayed on the monitor of a computer or the like. In the example of FIG. 6A, two tickets, the ticket T1 and the ticket T2, are located at the same priority, and the example is a image for prompting a user to select one of these electronic tickets. The user sets the cursor to the ticket to be selected, and selects the electronic ticket with a selection button operation or the like. The example of FIG. 6A shows the state in which the cursor is set to the ticket T1.

Moreover, the priority order set by the electronic ticket selection unit 40 may be set in a manner that can be changed by the user. FIG. 6B is a view showing a priority order change image, and shows a state in which the priority order has been set in the order of the ticket T2, the ticket T3 and the ticket T1. In this state, a user sets the cursor to a ticket the priority order of which the user wants to change, and changes the priority order by performing a button operation of changing the priority order toward a higher priority, or a button operation of changing the priority order toward a lower priority. In the example of FIG. 6B, the cursor is set to a ticket T1. When the user performs a button operation of changing the ticket toward a higher priority, the ticket T1 is changed to have a higher priority than that of ticket T3. In such away, the configuration which leaves the final selection of an electronic ticket to a user is realizable.

As described above, although embodiments (Embodiment 1 and Embodiment 2) of the present invention have been described, the examples use to illustrate the embodiments as described above are only illustrations, and are not intended to limit the scope of the present invention. For example, in FIGS. 1 and 3, although the computer 10 which functions as an electronic ticket processing apparatus has been described, a portable information terminal such as a personal digital assistance (PDA) may be used as the electronic ticket processing apparatus in place of the computer 10.

Moreover, an electronic ticket processing apparatus according to the present invention is an electronic ticket processing apparatus selecting an optimum electronic ticket among a plurality of electronic tickets for imparting a rights of use of content, wherein the electronic ticker processing apparatus includes an extraction unit that extracts a plurality of electronic tickets corresponding to the content, and a selection unit that selects the optimum electronic ticket by comparing conditions of use of content included in each of the extracted electronic tickets.

Moreover, an electronic ticket selection method of the present invention is an electronic ticket selection method for selecting an optimum electronic ticket among a plurality of electronic tickets for imparting rights of use of content, comprising: extracting a plurality of electronic tickets corresponding to the content; and selecting the optimum electronic ticket by comparing conditions of use of content included in each of the extracted plurality of electronic tickets.

The entire disclosure of Japanese Patent Application No. 2005-041652 filed on Feb. 18, 2005 and Japanese Patent Application No. 2005-050502 filed on Feb. 25, 2005 including their specifications, clams, drawings, and abstracts is incorporated herein by reference.

What is claimed is:

1. A computer-readable media on which is stored a program for selecting and providing, for a user, an electronic ticket among a plurality of electronic tickets for imparting pre-defined rights to use predetermined digital content, the stored program causing a computer to execute functions comprising:

electronically extracting, from an electronic ticket storage unit, a plurality of electronic tickets, each extracted electronic ticket having content corresponding to the predetermined digital content;

electronically prioritizing the extracted electronic tickets based upon conditions of use with respect to content included in the respective extracted electronic tickets so that the extracted electronic tickets are placed in an order based upon the prioritization;

electronically determining, sequentially, corresponding to the order of the extracted electronic tickets, if the extracted electronic ticket provides the pre-defined rights to use the predetermined digital content; and providing the determined extracted electronic ticket, to the user, to enable the user to use the predetermined digital content.

2. A medium according to claim 1, wherein a full access right to use the predetermined digital content is a condition for prioritizing the extracted electronic tickets.

3. A medium according to claim 1, wherein a number of permitted user operations upon the predetermined digital content is a condition for prioritizing the extracted electronic tickets.

4. A medium according to claim 1, wherein no expiration date to use the predetermined digital content is a condition for prioritizing the extracted electronic tickets.

5. A medium according to claim 1, wherein a number of allowed ticket usages to enable use of the predetermined digital content is a condition for prioritizing the extracted electronic tickets.

6. A medium according to claim 1, wherein a payment method for using the extracted electronic ticket to enable use of the predetermined digital content is a condition for prioritizing the extracted electronic tickets.

7. A medium according to claim 1, wherein a point value of the extracted electronic ticket is a condition for prioritizing the extracted electronic tickets.

8. A medium according to claim 1, wherein allowed usage times for using the extracted electronic ticket to enable use of the predetermined digital content is a condition for prioritizing the extracted electronic tickets.

9. A medium according to claim 1, wherein the conditions for prioritizing the extracted electronic tickets are user defined.

10. The medium according to claim 1, wherein the stored program causing a computer to execute functions further comprises:

displaying conditions of use upon which the electronic prioritization of the extracted electronic tickets is based.

11. The medium according to claim 1, wherein the stored program causing a computer to execute functions further comprises:

displaying conditions of use upon which the electronic prioritization of the extracted electronic tickets is based; and changing the displayed conditions of use upon which the electronic prioritization of the extracted electronic tickets is based so as to change the prioritization of the extracted electronic tickets.

12. The medium according to claim 11, wherein a user changes the displayed conditions of use upon which the electronic prioritization of the extracted electronic tickets is based.

13. The medium according to claim 1, wherein the stored program causing a computer to execute functions further comprises:

displaying a plurality of extracted electronic tickets having a same prioritization when the plurality of extracted electronic tickets have a same prioritization; and prompting a user to select one of the displayed plurality of extracted electronic tickets having a same prioritization.

14. An electronic ticket processing apparatus selecting and providing, for a user, an electronic ticket among a plurality of electronic tickets for imparting pre-defined rights to use predetermined digital content, comprising:

an extraction unit to electronically extract, from an electronic ticket storage unit, a plurality of electronic tickets, each extracted electronic ticket having content corresponding to the predetermined digital content;

a priority unit to electronically prioritize the extracted electronic tickets based upon conditions of use with respect to content included in the respective extracted electronic tickets so that the extracted electronic tickets are placed in an order based upon the prioritization; and an authentication unit to electronically determine, sequentially, corresponding to the order of the extracted electronic tickets, if the extracted electronic ticket provides the pre-defined rights to use the predetermined digital content and to provide the determined extracted electronic ticket, to the user, to enable the user to use the predetermined digital content.

15. The electronic ticket processing apparatus according to claim 14, further comprising:

a display to display conditions of use upon which the electronic prioritization of the extracted electronic tickets is based.

16. The electronic ticket processing apparatus according to claim 14, further comprising:

a display to display conditions of use upon which the electronic prioritization of the extracted electronic tickets is based; and a condition of use unit to change the displayed conditions of use upon which the electronic prioritization of the extracted electronic tickets is based so as to change the prioritization of the extracted electronic tickets.

17. The electronic ticket processing apparatus according to claim 16, further comprising:

a user interface, operatively connected to said condition of use unit, to input instructions to cause said condition of use unit to change the displayed conditions of use upon which the electronic prioritization of the extracted electronic tickets is based so as to change the prioritization of the extracted electronic tickets.

18. The electronic ticket processing apparatus according to claim 14, further comprising:

a display to display a plurality of extracted electronic tickets having a same prioritization when the plurality of extracted electronic tickets have a same prioritization;

said display prompting a user to select one of the displayed plurality of extracted electronic tickets having a same prioritization.

19. An electronic ticket selection method for selecting and providing, for a user, an electronic ticket among a plurality of electronic tickets for imparting pre-defined rights to use predetermined digital content, comprising:

electronically extracting, from an electronic ticket storage unit, a plurality of electronic tickets, each extracted electronic ticket having content corresponding to the predetermined digital content;

electronically prioritizing the extracted electronic tickets based upon conditions of use with respect to content included in the respective extracted electronic tickets so that the extracted electronic tickets are placed in an order based upon the prioritization;

electronically determining, sequentially, corresponding to the order of the extracted electronic tickets, if the extracted electronic ticket provides the pre-defined rights to use the predetermined digital content; and providing the determined extracted electronic ticket, to the user, to enable the user to use the predetermined digital content.

20. The electronic ticket selection method according to claim 19, further comprising:

displaying conditions of use upon which the electronic prioritization of the extracted electronic tickets is based.

21. The electronic ticket selection method according to claim 19, further comprising:

displaying conditions of use upon which the electronic prioritization of the extracted electronic tickets is based; and changing the displayed conditions of use upon which the electronic prioritization of the extracted electronic tickets is based so as to change the prioritization of the extracted electronic tickets.

22. The medium according to claim 21, wherein a user changes the displayed conditions of use upon which the electronic prioritization of the extracted electronic tickets is based.

23. The electronic ticket selection method according to claim 19, further comprising:

displaying a plurality of extracted electronic tickets having a same prioritization when the plurality of extracted electronic tickets have a same prioritization; and prompting a user to select one of the displayed plurality of extracted electronic tickets having a same prioritization.

* * * * *